Feb. 12, 1929.
R. W. BURNS
1,702,036
CLAMP CARRIER
Filed Feb. 1, 1926
3 Sheets-Sheet 3
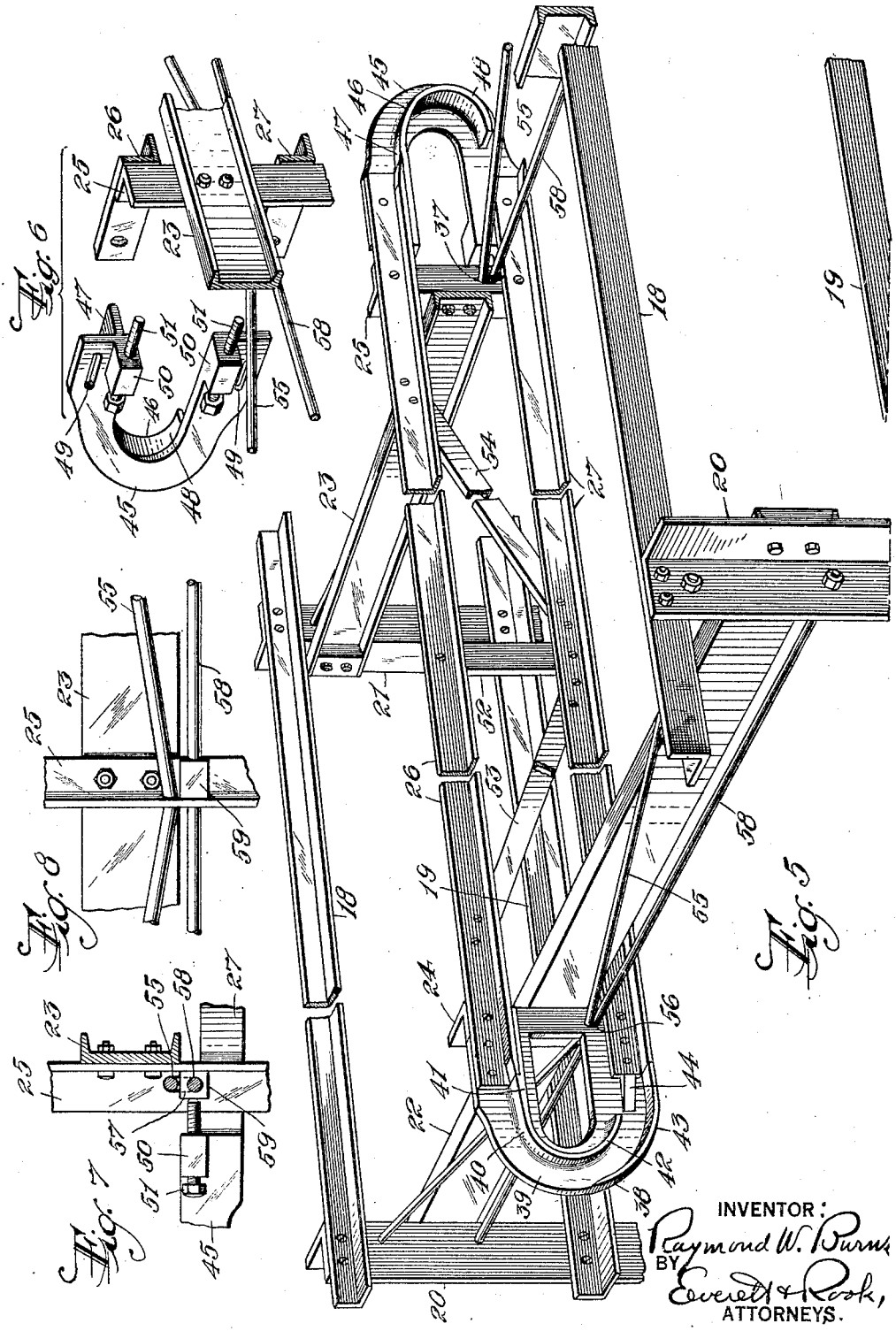

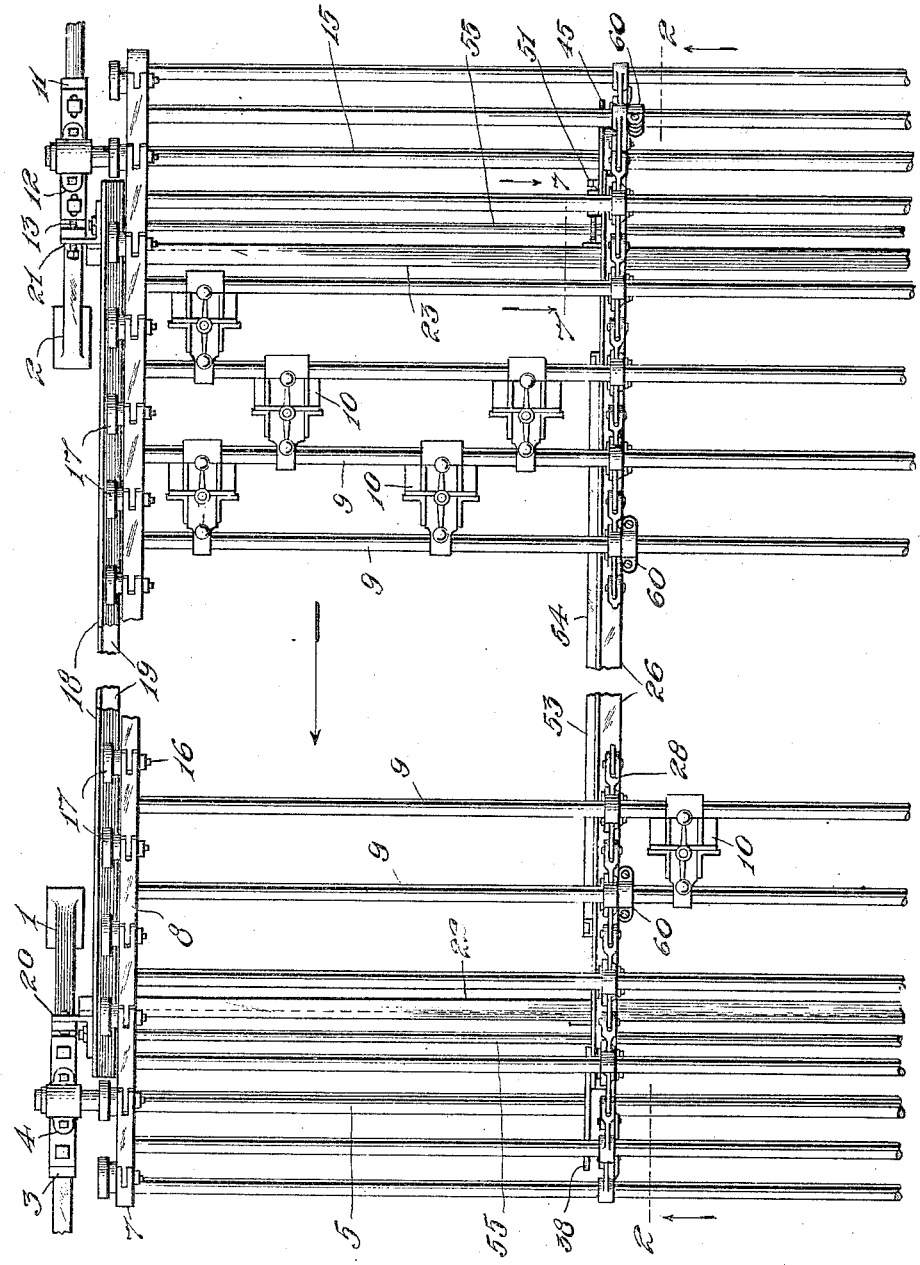

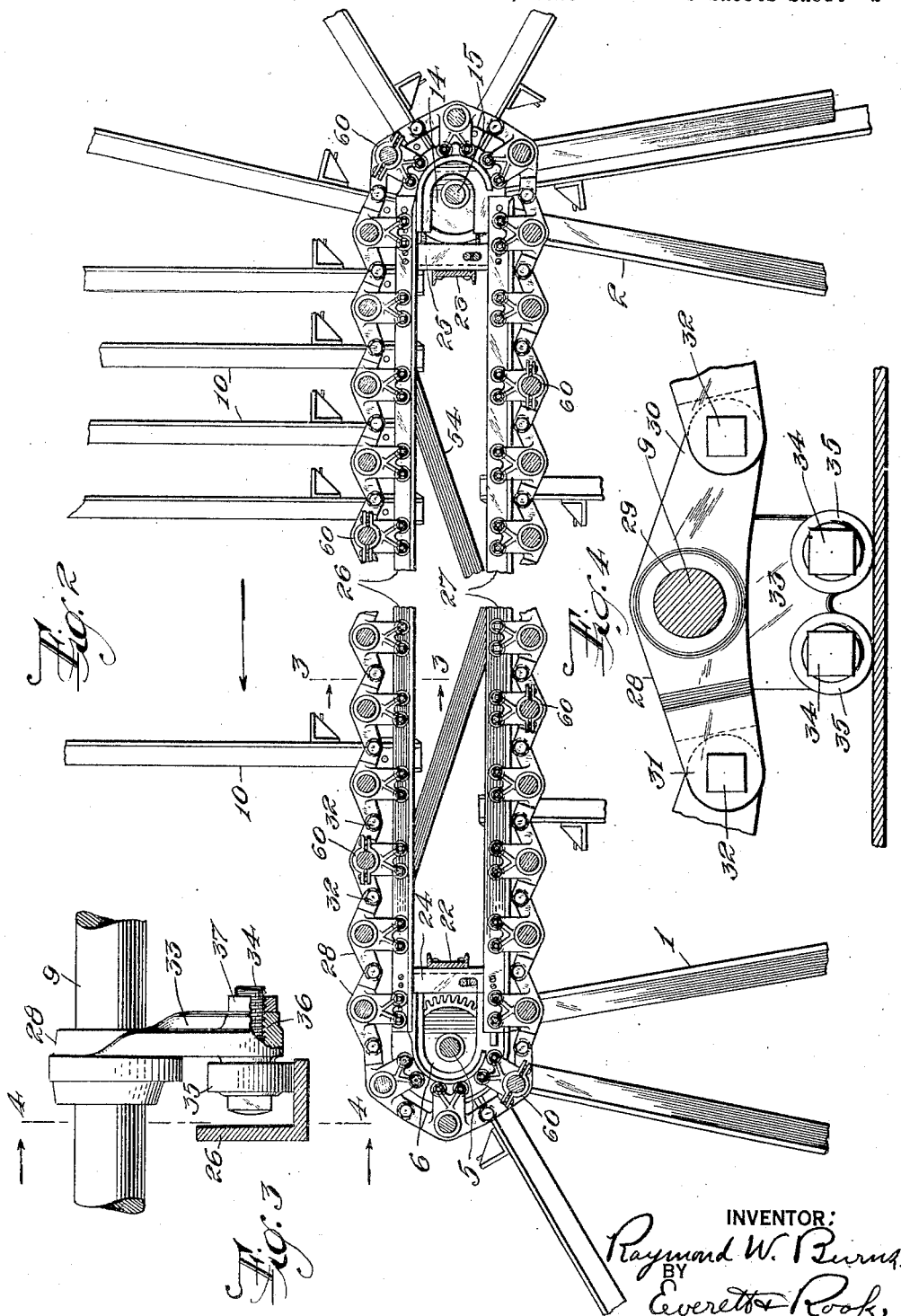

Patented Feb. 12, 1929.

1,702,036

UNITED STATES PATENT OFFICE.

RAYMOND W. BURNS, OF POUGHKEEPSIE, NEW YORK, ASSIGNOR TO JAMES L. TAYLOR MANUFACTURING CO., A CORPORATION OF NEW YORK.

CLAMP CARRIER.

Application filed February 1, 1926. Serial No. 85,181.

This invention relates to what is known as the chain type of clamp carrier or one which employs an endless or continuous conveyor with side chains which run over pulleys at the ends of the machine and runways extending between such pulleys, the conveyor having cross-bars upon which the clamps are slidably mounted, all as shown in prior Patent No. 1,320,808 to James L. Taylor. Clamp carriers of this type have come into extensive use and are being employed for work which is continually increasing in size and length, so that manufacturers find it desirable to build the carriers with increasingly wider conveyors. The width has been limited, however, by the fact that cross-bars beyond a certain length bend and sag at their middle portions too much to be practical, and it is to remedying this difficulty that the present invention more particularly relates.

The objects of the invention are to provide improved longitudinal supporting means for the conveyor of a clamp carrier and more particularly for the cross-bars of such a conveyor; to form for links on such cross-bars a track extending along the entire path of travel of said links with the conveyor; to provide such a track which can be adjusted to tighten or loosen the series of links; to form such a track of upper and lower runways and end members connecting the same; to provide an easy transition of the links from the upper runway to the lower runway and vice versa; to secure a support which can be used intermediate the side edges of a conveyor; to secure means for mounting an intermediate support with the necessary firmness and stability, and to obtain other advantages and results as may be brought out by the following description.

Referring to the accompanying drawings, in which like characters of reference indicate the same parts in the several views, Figure 1 is a plan of a portion of a clamp carrier embodying my invention, the conveyor being adapted to move in the direction indicated by the large arrow;

Figure 2 is a section of the same on line 2—2, Fig. 1, looking in the direction indicated by the arrows on said line;

Figure 3 is an end view of a single link on larger scale, looking toward the rear of the machine and showing the upper runway in section as on line 3—3, Fig. 2;

Figure 4 is a view of a link from the opposite side to that shown in Figure 2, as on line 4—4, Fig. 3;

Figure 5 is a perspective view of my new support and means for mounting it intermediate the lateral edges of a conveyor, looking in the same direction as in Figure 2, certain parts being broken away to show the construction more clearly;

Figure 6 is a perspective view of the rear end of the support, looking at the opposite side from that shown in Figure 5 and showing the end member separated from the runways for greater clearness;

Figure 7 is a detail section taken vertically and longitudinally of the machine, as on line 7—7, Fig. 1, looking in the direction of the arrow, to show the lower rear end adjusting means of the support squarely from the side which is viewed obliquely in Fig. 6, and Figure 8 is a rear end view of the parts against which the adjusting screws seat.

In the specific embodiment of the invention shown in said drawings, 1 and 2 indicate front and rear standards at one side of the machine, it being understood that there are similar standards at the other side of the machine, not shown. Each of the front standards 1 provides at its top 3 a journal bearing 4 for a cross-shaft 5 having near each standard a toothed wheel 6 (Figure 2) to drive the side chains 7 composed of links 8 between which extend the cross-bars 9 upon which the clamps 10 are mounted. The rear standards 2 are like the front ones, except that each rear standard has at its top 11 a sliding-shoe 12 which is adjustable as by a screw 13, so that the side chains 7 which run over grooved pulleys 14 on a rear cross-shaft 15 mounted in said bearings 12 can be tightened or loosened, as desired. The links 8 of the side chains are pivoted together at their ends by pins 16 which also carry at the outside of the chain rollers 17 to run between the front driving wheels 6 and rear pulleys 14 upon upper and lower runways 18, 19 which are shown supported by angle iron uprights, 20, 21 extending upward from said standards, respectively. All said parts thus far described are old in the art, being substantially as shown in the Taylor Patent No. 1,320,808 above-mentioned and employed here for illustrative purposes merely; any other construction for accomplishing the same results could be employed without departing from the spirit and scope of the present invention.

This invention, as has already been explained, is more particularly to provide means for supporting the clamp-carrying cross-bars 9 intermediate the supporting means at the ends of said cross-bars, in cases where great width of the machine renders such intermediate support desirable, and in the drawings I have shown one such intermediate supporting means, although obviously more than one could be employed if desired. For carrying my improved intermediate support I employ bridging members extending through the conveyor, which I have shown as channel beams one 22 bolted to the rear sides of the angle-iron uprights 20 of the front standards 1 so as to extend across the machine in edgewise position between the upper and lower runways 18 and 19 and somewhat to the rear of the shaft 5 and its toothed wheels 6, as shown in Figs. 1 and 2. A similar channel beam 23 is bolted to the front sides of the angle-iron uprights 21 of the rear standards and extends between the upper and lower runways 18 and 19 somewhat in front of the rear shaft 15 and grooved pulleys 14, both said channel beams being in edgewise position and bolted flatwise against the uprights 20 and 21 so that the flanges of the channel beams project towards each other, as clearly shown. Front and rear upright cross-pieces 24 and 25, respectively, preferably of angle iron, are bolted against the front and rear faces of the channel beams 22 and 23 respectively, one flange of each cross-piece lying flatwise against its channel beam and the other projecting therefrom, and to these projecting flanges are bolted upper and lower angle-iron runways 26 and 27 respectively, which thus extend longitudinally of the machine one above and the other below the cross-beams 22 and 23. They are substantially parallel to the lateral runways 18 and 19 at each side of the machine, and are adapted to receive and support links 28 upon the cross-bars 9 which will next be described.

Each of the links 28 is apertured as at 29 to receive a cross-bar 9, and has its front and rear ends one tongued as at 30 and the other forked as at 31 to receive the tongue of the next link, whereby the links can be pivoted together by means of small bolts 32. Beneath the aperture 29 for the cross-bar 9 each link has a downward extension 33 which provides at its lower end transverse seats for bolts 34 upon each of which is journaled a roller 35. I prefer to use two such rollers, as shown, and the pivotal bolt 34 of each is screwed into the extension 33, as at 36, Fig. 3, and receives a nut 37 at the opposite side of the extension from the roller. Furthermore the extension 33 is off-set, in end view of the link, as shown in Fig. 3, so as to bring the rollers 35 directly beneath the bearing of the cross-bar in the link. The said links travel by their rollers 35 upright on the upper runway 26 and in inverted position upon the lower runway 27 or depending therefrom, as will be understood from Fig. 2, thus serving to support the cross-bars 9 from sagging intermediate their ends or end supporting means. At the same time it will be noted that the alinement of the cross-bars is left entirely to the side sprocket chains 7, 7, since if the center support also attempted to aline the cross-rods it would be objectionable as a three-point alinement.

In order to conduct the links and provide a track for them to run upon, in passing from the upper runway to the lower runway at the front of the machine and vice versa at the rear of the machine, end members of a bent or U-shape in general are provided to be secured to the ends of the upper and lower runways, the end member 38 at the front of the machine, which is shown most clearly in Figure 5, consists of a casting having a main plate-like portion 39 of a general U-shape, the ends of the arms of which are adapted to butt against the edge of the angle-iron upright 24 and lie flatwise against the vertical flanges of the ends of the angle-iron runways 26, 27 so as to be secured thereto, as shown, by screws whose heads bear against the casting and whose ends terminate flush with the opposite surface of the vertical flange of the runway. This plate-like body portion 39 has near its inner edge a laterally projecting flange 40 with a horizontal upper portion 41 adapted to lie beneath the horizontal flange of the upper angle-iron runway 26 and form a continuation thereof, the other end of said flange 40 being curved downwardly concentric with the shaft 5, as at 42, see Figure 3. A lower flange 43 also projects from the outer edge of the main platelike portion 39 of the end member, having its upper end part substantially concentric with the upper flange 42 to receive the links 28 therefrom and its lower end part straightened to form a continuation of the lower runway 27. A fillet 44 is provided on the lower arm of the plate-like portion 39 of the end member 38 to guide the links on to the lower runway 27, and the upper runway 26 is fitted to the end member 38 in any suitable manner to prevent a step or drop.

At the rear end of the machine is an end member 45 bolted to the rear ends of the upper and lower runways 26, 27 and having a laterally projecting flange 46 whose upper part 47 forms a smooth approach to the upper runway 26 and whose lower part 48 is curved to receive the upward pressure of the rollers 35 of the links 28 immediately after they leave the lower runway 27. In order to enable the chain of links to be adjusted tighter or looser, in conformity with adjustment of the side chains 7, the rear end member 45 just described has the bolts which secure it to the upper and lower runways extending through slots 49, 49 in the arms of the end member, and said arms are further provided with lugs 50, 50 at their sides away from the runway track to receive screws 51, 51 adapted to press against the angle-iron cross-piece 25 on the channel beam 23 and thus enable the end member to be moved rearward when its attaching bolts are slackened, in order to tighten the chain of links.

In order to strengthen or stiffen the upper and lower runways 26 and 27 with respect to each other, braces 52, 53, 54, preferably of light channel bar, extend from one to the other, as shown, particularly in Fig. 5. Furthermore, I have shown the cross-beams 22, 23 which carry the intermediate support supplemented by front and rear truss rods 55 extending across the clamp carrier one adjacent each of said cross-beams and passing through holes 56, 57 in the flanges of the angle-iron cross-pieces 24, 25, respectively, the ends of said truss rods being secured to the angle-iron uprights 20 and 21 to which the side runways of the machine are bolted. Beneath each of said truss rods 55, a tie rod 58 extends horizontally across the machine between the pairs of side angle-bar uprights 20 and 21, each tie rod passing through the same aperture or slot 56, or 57, in the intermediate angle-iron cross-piece 24, or 25, as its truss rod 55 and being in the same vertical plane therewith. In connection with each cross-beam, the truss rod and tie rod adjacent thereto serve to carry the intermediate support for the conveyor and resist any tendency of its cross-rods to sag or bend downward.

In the construction illustrated, the tie rod 58 at the rear end of the intermediate support is directly in line with the lower adjusting screw 51 of the end member 45, as shown in Figure 7, and therefore said tie rod is provided at that point with an enveloping block or casing 59 with opposite flat sides one of which rests against the angle-iron cross-piece 25 while the other is adapted to receive the end of the adjusting screw 51.

It will be understood that such a support as I have described can be placed anywhere intermediate the sides of the conveyor, to prevent sagging of its cross-bars, and that the vertical flanges of the track which it provides for the chain of links 28 will prevent displacement or sliding of said links upon the cross-bars in one direction. To prevent sliding in the other direction, I have shown split collars 60 clamped upon a sufficient number of the cross-bars 9, at the opposite side of the chain of links 28 from the said vertical flange of the track, see Figures 1 and 2.

Obviously many structural modifications could be made by those skilled in the art, in building my improved clamp carrier, without departing from the spirit and scope of the invention, and I do not wish to be understood as limiting myself except as required by the following claims when construed in the light of the prior art.

Having thus described the invention, what I claim is:

1. In a clamp carrier, the combination with front and rear pairs of spaced sprocket wheels, endless chains running over said sprocket wheels, and clamp-receiving cross-bars extending between said chains each from a link in one chain to an opposite link in the other chain, of links on said cross-bars intermediate their ends and pivotally connected midway between the cross-bars, such intermediate links having each an inwardly projecting extension at its middle cross-bar-engaging portion, tandem rollers upon each of said extensions, and a track for said rollers.

2. In a clamp carrier, the combination with a frame, and a continuous conveyor mounted thereon having clamp-receiving cross bars, of tandem rollers for each of said cross bars intermediate its ends, said rollers being on opposite sides of a plane through the cross bar normal to the conveyor, and a track for said rollers.

3. In a clamp carrier, the combination with a frame, and a continuous conveyor mounted thereon having clamp-receiving cross bars, of links on said cross bars intermediate their ends and each having inwardly projecting supporting means at its middle cross bar-engaging portion and having end portions at an acute angle to said extension, means pivotally connecting said intermediate links by their said end portions, and a track for the said inwardly projecting supporting means.

4. In clamp carrier, the combination with a frame, and a continuous conveyor mounted thereon having clamp-receiving cross bars, of links on said cross bars intermediate their ends and pivotally connected midway between the cross bars, such intermediate links each having an inwardly projecting laterally offset extension at its middle cross bar-engaging portion, rollers upon the sides of said extension beneath the links, and a track for said rollers.

5. In a clamp carrier, the combination of a continuous conveyor with clamp-receiving cross bars, links on said cross bars intermediate their ends, upper and lower runways inside said conveyor for its said links, U-shaped end-members mounted on said runways and connecting the same one of said end-members having arms slidably overlapping the ends of the runways, means for sliding said last-mentioned end-member with respect to said runways, clamping bolts extending from one of said parts through slots in the other part, and means for supporting said runways.

6. In a clamp carrier, the combination of a continuous conveyor with clamp-receiving cross bars, links on said cross bars intermediate their ends, upper and lower runways inside said conveyor for its said links, U-shaped end-members mounted on said runways and connecting the same one of said end-members having arms slidably overlapping the ends of the runways, screws for adjusting one each arm of said member with respect to its runway, clamping bolts extending from one of said parts through slots in the other part, and means for supporting said runways.

7. In a clamp carrier, the combination with a frame, and a continuous conveyor mounted thereon having clamp-receiving cross bars, of inwardly projecting rollers on said cross bars intermediate their ends, an angle-bar track for said rollers, and means on the cross bars at the opposite side of the rollers from the upright flange of the angle-bar for keeping said rollers on said track.

8. In a clamp carrier, the combination with a frame, and a continuous conveyor mounted thereon having clamp-receiving cross bars, of inwardly projecting rollers on said cross bars intermediate their ends, an angle-bar track for said rollers, and adjustable clamping-collars on the cross bars at the opposite side of the rollers from the upright flange of the angle-bar for keeping said rollers on said track.

9. In a clamp carrier, the combination of a frame, a conveyor mounted in said frame with clamp-receiving cross bars, links on said cross bars intermediate their ends and provided with rollers, cross-beams on said frame extending through said conveyor, upper and lower runways mounted on said beams intermediate their ends, and end-members connecting said runways and providing therewith a track for said rollers throughout their path of travel with the conveyor.

10. In a clamp carrier, the combination of a frame, a conveyor mounted in said frame with clamp-receiving cross bars, links on said cross bars intermediate their ends and provided with rollers, cross-beams on said frame extending through said conveyor, uprights on said beams intermediate their ends, upper and lower runways on said uprights, and end-members connecting said runways and providing therewith a track for said rollers throughout their path of travel with the conveyor.

11. In a clamp carrier, the combination of a frame, a conveyor mounted in said frame with clamp-receiving cross bars, links on said cross bars intermediate their ends and provided with rollers, cross-beams on said frame extending through said conveyor, upper and lower runways mounted on said beams intermediate their ends, truss-rods for said runways one adjacent each of said cross-beams, and end-members connecting said runways and providing therewith a track for said rollers throughout their path of travel with the conveyor.

12. In a clamp carrier, the combination of a frame, a conveyor mounted in said frame with clamp-receiving cross-bars, links on said cross-bars provided with rollers, cross-beams on said frame extending through said conveyor, uprights on said beams apertured at the lower edge thereof, a truss rod for each beam extending through the aperture of its upright, and a support on said uprights forming a track for said rollers.

13. In a clamp carrier, the combination of a frame, a conveyor mounted in said frame with clamp-receiving cross-bars, links on said cross-bars provided with rollers, cross-beams on said frame extending through said conveyor, uprights on said beams apertured at the lower edge thereof, a truss-rod for each beam extending through the aperture of its upright, a tie-rod for each beam also extending through the aperture of its upright, and a support on said uprights forming a track for said rollers.

14. In a clamp carrier, a continuous conveyor providing a series of clamp-receiving cross-bars, driving links on the ends of said cross-bars pivotally connected to each other, driving wheels engaging said driving links to drive the conveyor, runways for said driving links between said driving wheels, idle links one on each cross-bar intermediate its ends and pivotally connected to each other, and a support providing an endless runway for said idle links.

15. In a clamp carrier, a continuous conveyor providing a series of clamp-receiving cross-bars, driving links on the ends of said cross-bars pivotally connected to each other, driving wheels engaging said driving links to drive the conveyor, runways for said driving links between said driving wheels, idle links one on each cross-bar intermediate its ends and pivotally connected to each other, said idle links having extensions projecting inwardly of the conveyor, and a support providing an endless runway for said extensions.

16. In a clamp carrier, the combination of a frame, a conveyor mounted in said frame and having clamp-receiving cross-bars, links on said cross-bars intermediate their ends, cross-beams on said frame extending through said conveyor, uprights one on each cross-beam, upper and lower angle-iron runways on said uprights for the said intermediate links of the conveyor, and U-shaped end-members mounted on the ends of said upper and lower runways and connecting the same to carry the links from one to the other.

17. In a clamp carrier, the combination of a frame, a conveyor mounted in said frame and having clamp-receiving cross-bars, links on said cross-bars intermediate their ends, cross-beams on said frame extending through said conveyor, uprights one on each cross-beam, upper and lower angle-iron runways on said uprights for the said intermediate links of the conveyor, and U-shaped end-members connecting the ends of said upper and lower runways and providing extensions thereof to carry the links from one runway to the other.

18. In a clamp carrier, the combination of a frame, a conveyor mounted in said frame and having clamp-receiving cross-bars, links on said cross-bars intermediate their ends, cross-beams on said frame extending through said conveyor, upper and lower angle-iron runways mounted on said cross-beams for the said intermediate links of the conveyor, and U-shaped end-members connecting the ends of said upper and lower runways and providing extensions thereof to carry the links from one runway to the other.

RAYMOND W. BURNS.